Figure 1:
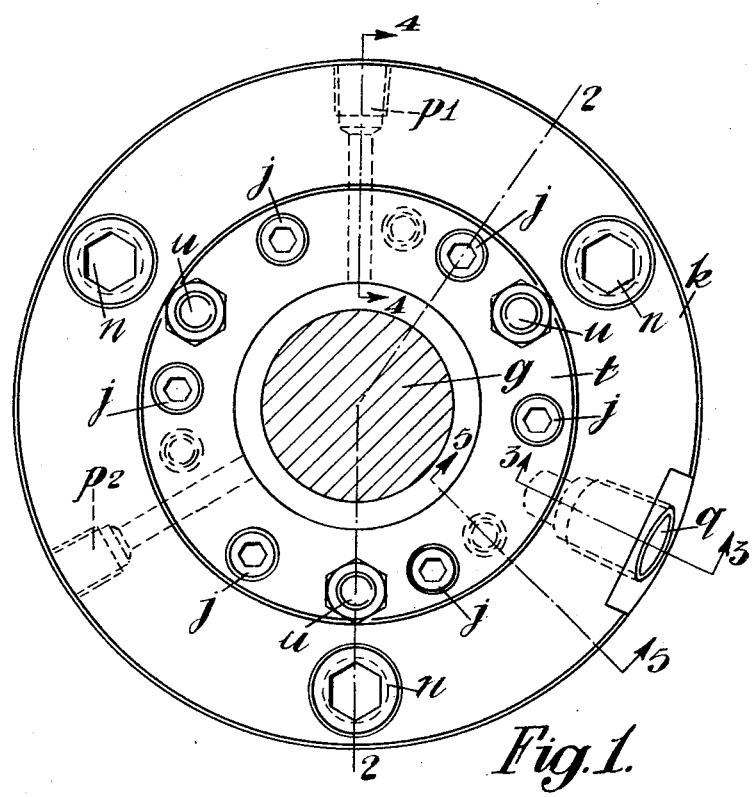

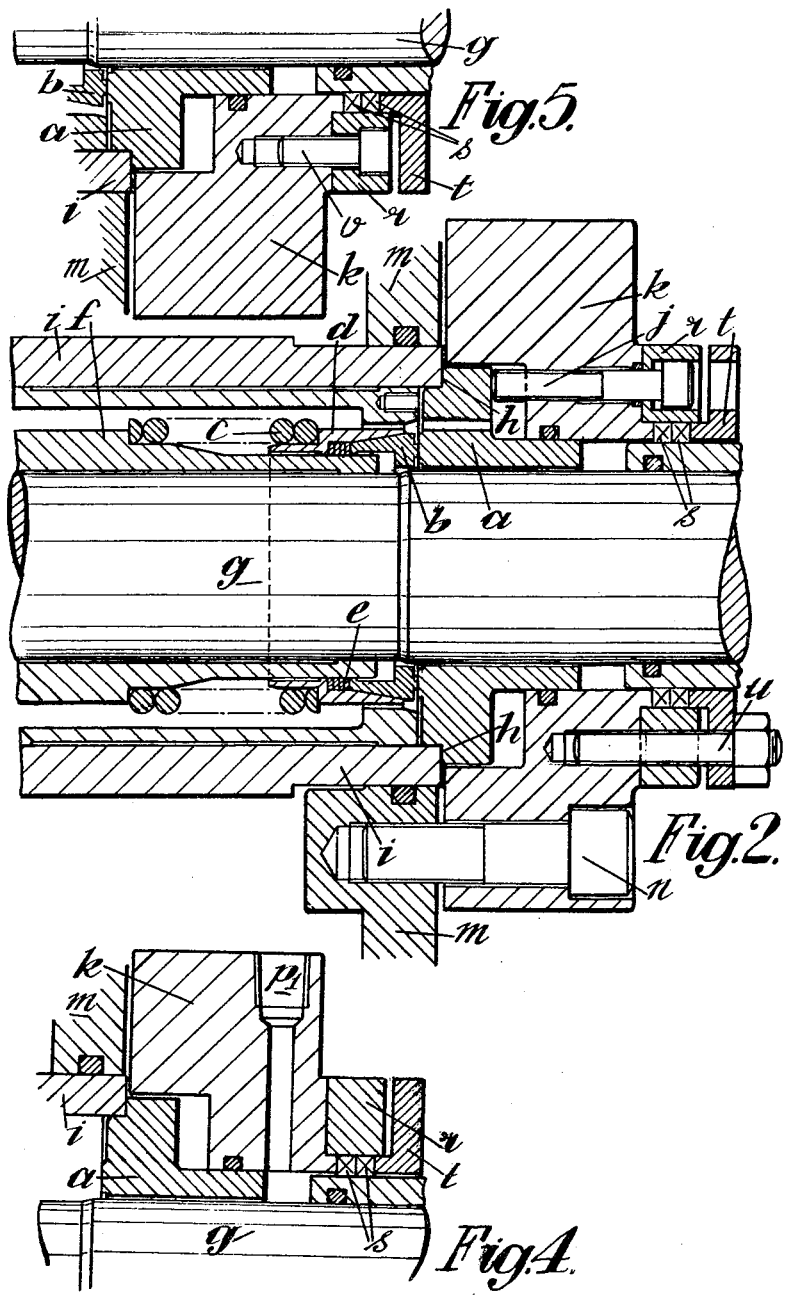

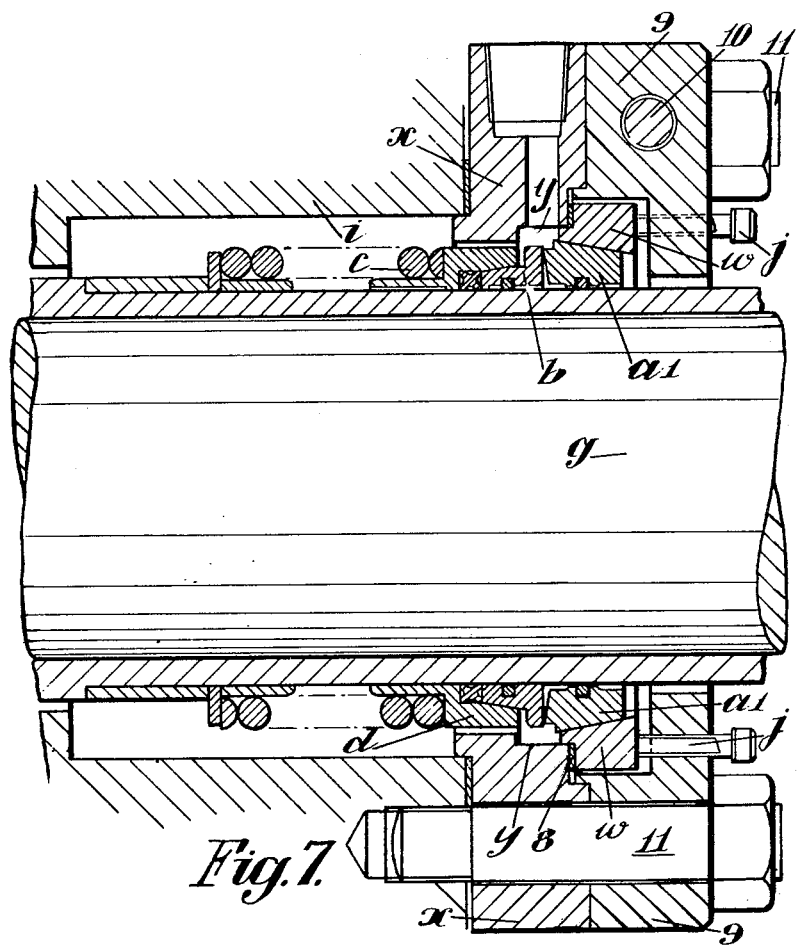

United States Patent Office 3,051,498
Patented Aug. 28, 1962

3,051,498
MECHANICAL SEALS
Frederick B. Porges, Ben Mar, Carr Wood, Hale Barns, Cheshire, England, assignor to Flexibox Limited, Manchester, England, a company of Great Britain
Filed Feb. 15, 1960, Ser. No. 8,758
Claims priority, application Great Britain Feb. 23, 1959
2 Claims. (Cl. 277—93)

This invention relates to mechanical seals for making a sealing joint between relatively rotating parts, such seals comprising interengaging rotary and stationary seal rings. In mechanical seals of the type in which the rotary seal ring is axially adjustable, the stationary seal ring may be either resiliently or rigidly mounted at the face of the stuffing box of the pump or other apparatus in connection with which the fluid seal is required.

The resiliently mounted type of stationary seal ring has the advantage that the seal ring may adjust itself more easily to the effects of misalignment or vibration of the rotating shaft, but it has the draw-back that the means of resilient mounting act also as a heat insulator and this raises the temperature at the seal faces and reduces the operating limits of the seal. It is also sometimes difficult to choose a resilient material which is acceptable under the particular operating conditions. The difficulty with a rigidly mounted stationary seal ring is that reasonable alignment and freedom from vibration are difficult to obtain. It is also difficult to mount such a stationary seal ring in such a way that the rubbing face against which the rotary seal ring bears is kept free from distortion.

The rubbing faces of a mechanical seal are normally lapped flat to within a few wave-lengths of light and it will be appreciated that the amount of distortion of the stationary face must be kept within limits of this order. Conventional bolting arrangements for the fixing of such a stationary seal ring almost inevitably cause distortion. It is general practice to supply only two bolts on the majority of pumps and the requirements of a mechanical seal should be adapted to this situation if at all possible.

The object of this invention is to provide a means of mounting the stationary seal ring so that distortion is kept within very close limits.

The invention consists in a mechanical seal for making a sealing joint between relatively rotating parts, such a seal comprising interengaging rotary and stationary seal rings, the rotary seal ring being resiliently pressed against the stationary seal ring, characterised in this that the stationary seal ring has a part of greater diameter than the rotary seal ring, such part being clamped to the annular face of the stuffing box by a plurality of screws on a pitch circle not less in diameter than the bore of the stuffing box so that the clamping pressure is transmitted substantially directly to the face of said stuffing box.

The invention further comprises a mechanical seal as aforesaid in which the outer part of the stationary seal ring is shouldered to pass partly into the stuffing box.

The invention further comprises a mechanical seal as aforesaid in which the stuffing box includes a separate annular member fixed thereto containing passageways for the fluid which is to cool or heat the seal, the stationary seal ring being applied to said member.

The invention further comprises a mechanical seal as aforesaid in which the stationary seal ring is made in two parts, the outer part being clamped to the stuffing box or to the fixed annular member secured to the stuffing box and the inner part against which the rotary seal ring bears being a wedge fit in the outer part.

Figure 3:
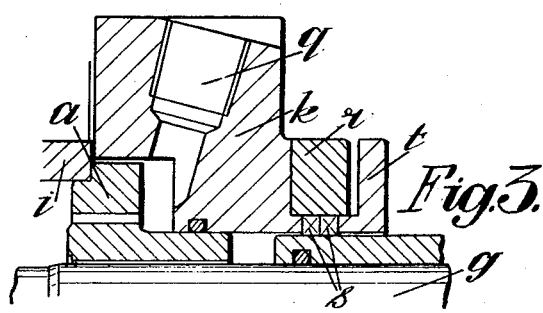

Referring to the accompanying explanatory drawings:
FIGURE 1 is an end view, FIGURE 2 a sectional view on the line 2—2 of FIGURE 1, FIGURE 3 a sectional view on the line 3—3 of FIGURE 1, FIGURE 4 a sectional view on the line 4—4 of FIGURE 1, and FIGURE 5 a sectional view on the line 5—5 of FIGURE 1, showing one form of mechanical seal having the improved mounting for the stationary seal ring thereof incorporated therein.

Figure 6:
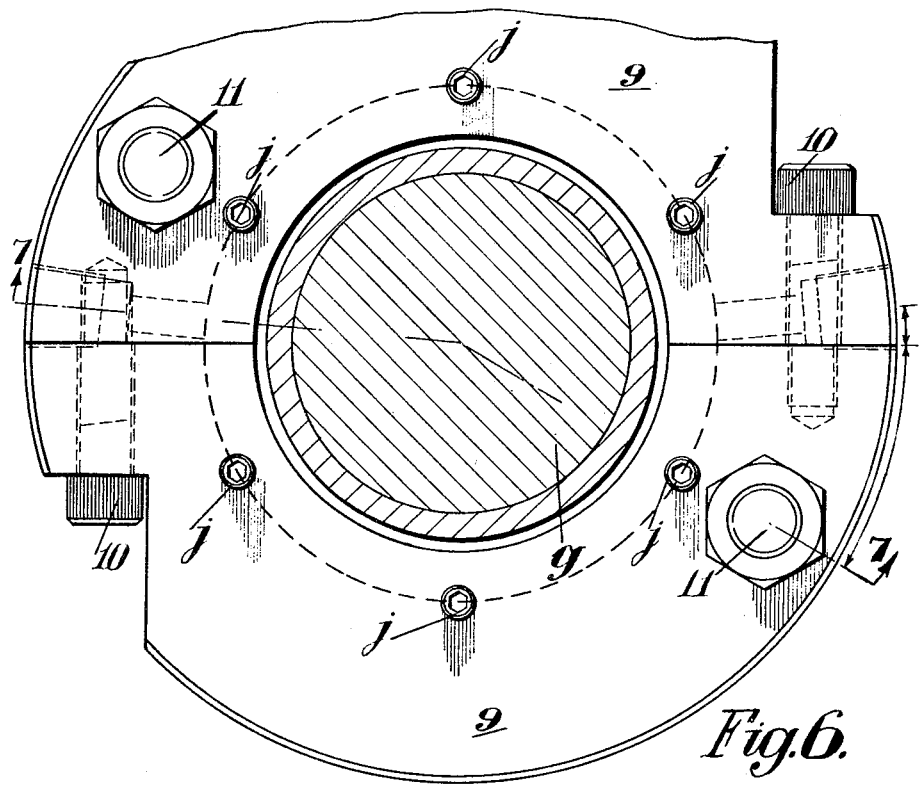

FIGURE 6 is an end view and FIGURE 7 a sectional view on the line 7—7 of FIGURE 6 showing a modified form of mechanical seal incorporating the present invention.

In FIGURES 1-5, $a$ indicates the stationary seal ring of the mechanical seal and $b$ the rotary seal ring. The latter is pressed against the stationary seal ring $a$ by the spring $c$ acting through the ring $d$, between which and the rotary seal ring are arranged packing washers $e$. The part $f$ against which one end of the spring $c$ bears revolves with the shaft $g$ and is suitably held against axial movement relatively to the shaft.

The stationary seal ring $a$ has a shoulder $h$ which bears upon the end face of the stuffing box $i$ and is pressed upon such end face by a plurality (in the drawing six) of set screws $j$ which screw into a backing flange $k$ which is fastened to a member $m$, which forms part of the pump, by screws $n$. The diameter of the pitch circle of the set screws $j$ is not less than the bore of the stuffing box $i$ against which the shoulder $h$ of the stationary seal ring $a$ bears. This disposition of the set screws $j$ ensures that whilst the stationary seal ring $a$ is held firmly in place, it is not distorted by the set screws $j$. Any distortion of the pump created by the screws $n$ can be compensated for by individual adjustment of the set screws $j$.

There is a connection $q$ in the backing flange $k$ for the passage of fluid which is to cool or heat the seal. There are also connections $p^1$ and $p^2$ in the backing flange $k$ for the circulation of quench fluid.

There is a ring $r$ through which the set screws $j$ pass and within this ring are located packing washers $s$ which are pressed upon axially by a flanged ring $t$ secured to the backing flange $k$ by nuts on studs $u$. The ring $r$ is secured to the backing flange $k$ by screws $v$.

In the arrangement shown in FIGURES 6 and 7, the rotary seal ring $b$ is pressed against the stationary seal ring $a^1$ by the spring $c$ acting through the ring $d$. The stationary seal ring $a^1$ is taper fitted in the ring $w$ which is pressed against the end face of a fixed annular member $x$ (secured to and forming part of the stuffing box) by a plurality (in the drawing six) of set screws $j$. The diameter of the pitch circle of the set screws $j$ is not less than the bore $y$ of the fixed annular member $x$ (and of the stuffing box) against which the ring $w$ bears. A packing washer 8 is interposed between parts $w$ and $x$. The internally flanged plate 9 into which the set screws $j$ are screwed is made in two parts fastened together by screws 10 and fastened to the stuffing box $i$ by studs 11.

What is claimed is:
1. A mechanical seal for making a sealing joint between relatively rotating parts, such a seal comprising a stuffing box, interengaging rotary and stationary seal rings in said stuffing box, the rotary seal ring being resiliently pressed against the stationary seal ring which is mounted at the face of the stuffing box of the apparatus in connection with which the fluid seal is required, characterised in that there is a member bolted to the stuffing box and surrounding the stationary seal ring, the stationary seal ring having a part of greater diameter than the rotary seal ring, such part being clamped to the annular face of the stuffing box by a plurality of screws threading through said member on a pitch circle which is not less in diameter than the bore of the stuffing box so that the clamping pressure of each screw is transmitted through the part of the stationary seal ring of greater diameter substantially directly to the face of said stuffing box.

2. A mechanical seal as claimed in claim 1 in which the stationary seal ring is made in two parts, the outer part being clamped to the stuffing box and the inner part against which the rotary seal ring bears being a wedge fit in the outer part.

References Cited in the file of this patent

UNITED STATES PATENTS

| | | |
|---|---|---|
| 2,170,134 | Flick | Aug. 22, 1939 |
| 2,199,761 | Shenton | May 7, 1940 |
| 2,434,458 | Curry | Jan. 13, 1948 |
| 2,971,784 | Tracy | Feb. 14, 1961 |